United States Patent

Gwilliam

[11] 3,712,209
[45] Jan. 23, 1973

[54] TUBE PRESSURE FILTERS

[75] Inventor: Ralph Derek Gwilliam, St. Austell, Cornwall, England

[73] Assignee: English Clays Lovering Pochin and Company Limited, St. Austell, Cornwall, England

[22] Filed: Feb. 1, 1971

[21] Appl. No.: 111,481

[30] Foreign Application Priority Data

Feb. 11, 1970 Great Britain..................6,696/70

[52] U.S. Cl.................100/112, 100/211, 210/350
[51] Int. Cl..............................B30b 9/06, B30b 5/02
[58] Field of Search......100/211, 112, 114, 115, 122, 100/123, 297, 298, 37; 210/178, 225, 229, 350

[56] References Cited

FOREIGN PATENTS OR APPLICATIONS 244,142  4/1963  Australia..............................100/211

Primary Examiner—Peter Feldman
Attorney—Larson, Taylor & Hinds

[57] ABSTRACT

The inlet for the hydraulic pressure fluid which is fed to the outer compartment of a tube pressure filter, which comprises a pair of co-axial tubular bodies forming between an annular chamber which is effectively divided by an impermeable elastic sleeve secured to the outer tubular body into inner and outer compartments, is provided by an annular inlet extending around the periphery of the outer tubular body.

5 Claims, 1 Drawing Figure

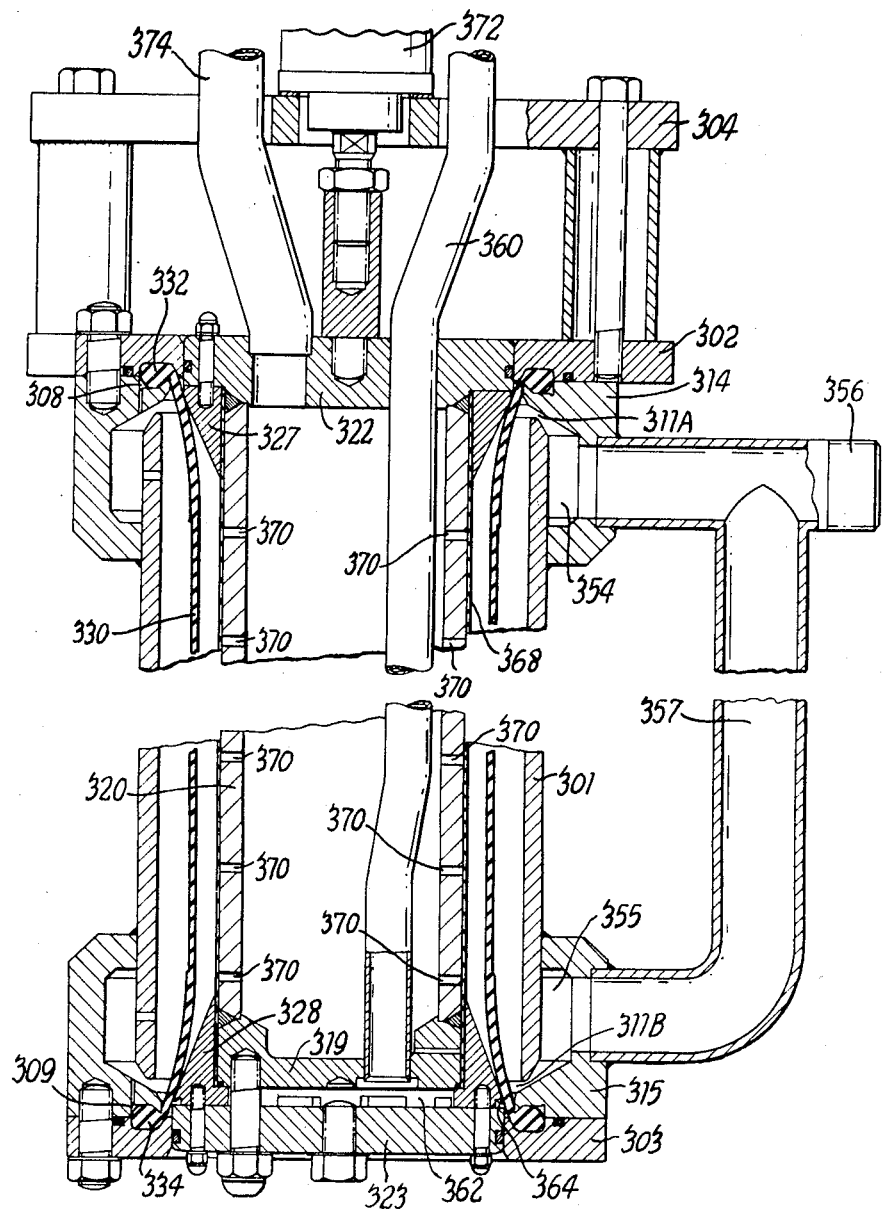

TUBE PRESSURE FILTERS

BACKGROUND OF THE INVENTION

This invention relates to apparatus for reducing the liquid content of wet, particulate solid materials.

It has been well known for many years to reduce the liquid content of wet, particulate solid materials, for example in the form of a slurry, by means of plate filter presses. When treating solid materials, such as clays and chalks, which contain a relatively high percentage, say more than 20 percent, of particles smaller than 20 microns, it is necessary to employ high pressures to produce a filter cake of low moisture content. However, serious engineering problems arise with conventional plate filter presses when it is desired to operate at very high pressures, for example in excess of 1,000 p.s.i. Consequently, in recent years there have been developed what are known as tube pressure filters which are capable of operating at such high pressures. Various kinds of tube pressure filters have been described; see, for example, U.K. Pat. No. 907,485 and my U.S. application Ser. No. 871,467 filed Oct. 23, 1969, now abandoned and replaced by streamlined continuation application Ser. No. 134,507, filed Apr. 15, 1971. One kind of tube pressure filter essentially comprises a pair of generally coaxial tubular bodies forming between them an annular chamber; an impermeable elastic sleeve which is secured to the outer of the pair of tubular bodies and divides said chamber into generally coaxial and non-communicating inner and outer compartments, the inner compartment including an inlet, for a wet particulate solid material to be pressure filtered, and a filter element which is supported by the inner of the pair of tubular bodies, the inner tubular body and the filter element being constructed and arranged so as to permit liquid to flow through the filter element and the inner tubular body while preventing the flow therethrough of the particulate solid material, and the outer compartment including an inlet for a hydraulic fluid under pressure whereby the impermeable elastic sleeve can be urged against a wet particulate solid material in the inner compartment to compress the same and remove liquid therefrom; and means for displacing the tubular bodies axially relative to one another to a position whereat the particulate solid material can be discharged from the inner compartment.

Heretofore the inlet provided in the outer compartment, for the introduction of a hydraulic fluid thereinto, has taken the form of one or at most two circular ports. It has been found inter alia that this has resulted in the filling of the outer compartment with hydraulic fluid occupying an excessively large proportion of the total cycle time of a pressure filtering operation.

It is an object of the present invention to overcome this disadvantage and to provide a tube pressure filter of the kind described above, whose outer compartment can be filled rapidly with hydraulic fluid.

SUMMARY OF THE INVENTION

It has now been found, in accordance with the present invention, that this object can be achieved by arranging the inlet for the hydraulic fluid to take the form of a substantially annular inlet extending around the periphery of the outer tubular body. More particularly the present invention provides a tube pressure filter which comprises a pair of generally coaxial tubular bodies forming between them an annular chamber; an impermeable elastic sleeve which is secured to the outer of the pair of tubular bodies and divides said chamber into generally coaxial and non-communicating inner and outer compartments, the inner compartment including an inlet for a wet particulate solid material to be pressure filtered, and a filter element which is supported by the inner of the pair of tubular bodies, the inlet being disposed at the lower end of the inner compartment and constructed such that when the tubular bodies are supported in a generally upright position, a wet particulate solid material to be pressure filtered can be charged to the bottom of said inner compartment through the inlet and distributed and directed substantially uniformly around the lower end of the inner compartment to enable scouring of at least the lower portion of the filter element, the inner tubular body and the filter element being constructed and arranged so as to permit liquid to flow through the filter element and the inner tubular body while preventing the flow therethrough of the particulate solid material, and the outer compartment including an inlet for a hydraulic fluid under pressure whereby the impermeable elastic sleeve can be urged against a wet particulate solid material in the inner compartment to compress the same and remove liquid therefrom; and means for displacing the tubular bodies axially relative to one another to a position whereat the particulate solid material can be discharged from the inner compartment; wherein the inlet provided in the outer compartment is in the form of a substantially annular inlet extending around the periphery of the outer tubular body.

DESCRIPTION OF THE PREFERRED EMBODIMENTS

The substantially annular inlet can be (a) a continuous annular slot, (b) a continuous or substantially continuous annular slot covered with a mesh of, for example, expanded metal, or (c) a plurality of small apertures distributed uniformly around an annular segment of the outer tubular body. The supply of hydraulic fluid to the substantially annular inlet can be effected by providing an annular chamber, or gallery, around the exterior wall of the outer tubular body and in communication with the substantially annular inlet, the hydraulic fluid being supplied to the annular chamber. With such an arrangement the annular chambers of two or more adjacent tube pressure filters can be connected together and supplied with a hydraulic fluid from a common source thereby enabling two or more tube pressure filters to be operated simultaneously. In order to prevent the impermeable rubber sleeves from being sucked into the substantially annular inlet under the action of a vacuum, for example when emptying the outer compartment of the hydraulic fluid, the slots or apertures, if not covered by a mesh, should be not greater than one-half inch and preferably not greater than three-sixteenths inch in width or diameter.

Advantageously, the annular inlet is disposed so that at least part of the hydraulic fluid is introduced into the outer compartment around the base thereof.

The present invention is particularly advantageous when incorporated in a tube pressure filter of the kind disclosed in my U.S. application Ser. No. 871,467 filed Oct. 23, 1969, now abandoned and replaced by streamlined continuation application Ser. No. 134,507, filed Apr. 15, 1971. Such tube pressure filters essentially comprise (a) a chamber of annular cross section substantially defined by two tubular bodies which are capable of withstanding high pressures, are arranged substantially coaxially one within the other and are displaceable axially relative to one another between operative and inoperative positions, and which have means which co-operate to form a seal between the adjacent ends of the two tubular bodies when the pressure filter is in the operative position, the outer tubular body being provided with an inlet for the introduction thereinto of a hydraulic fluid and the inner tubular body being provided with a plurality of apertures for the passage therethrough of filtrate, (b) a filter element supported by and extending around the external wall of the inner tubular body, the filter element being arranged so as to prevent the passage through the apertures in said inner tubular body of a particulate solid material being pressure filtered, (c) an impermeable elastic sleeve disposed in said chamber of annular cross section and secured in liquid-tight manner to the outer tubular body so as to divide said chamber into non-communicating inner and outer compartments of annular cross section, said outer compartment of annular cross section being effectively defined by the impermeable elastic sleeve and the internal wall of the outer tubular body and said inner compartment of annular cross section being effectively defined by the impermeable elastic sleeve and the external wall of the inner tubular body, (d) means for introducing a wet, particulate solid material to be pressure filtered under pressure through an inlet at the lower end of said inner compartment of annular cross section in a manner such that said wet, particulate solid material is charged to the bottom of said second compartment substantially uniformly around the inner tubular body so as to scour that part of the filter element supported by the lower portion of the inner tubular body, (e) means for removing filtrate from the interior of the inner tubular body, (f) means for displacing the tubular bodies axially relative to one another from the operative position to the inoperative position after a pressure filtering operation and (g) means for removing the particulate solid material from the surface of the filter element after the liquid has been removed from the solid material and the inner and outer tubular bodies have been axially displaced relative to one another to the inoperative position.

For a better understanding of the invention, and to show how the same may be carried into effect, reference will now be made by way of example to the accompanying drawing which shows one embodiment of a tube pressure filter in accordance with the present invention.

In the drawing there is shown a tube pressure filter which is constructed in a manner similar to that described in my said U.S. application Ser. No. 134,507 except that the inlet for the hydraulic fluid takes the form of annular inlet slots 311A and 311B, each of which has a width of three-sixteenths inch, formed in the outer tubular body. The annular inlet slots are surrounded by annular galleries 354 and 355, respectively. The hydraulic fluid is supplied to the annular galleries 354 and 355 through a conduit 356, and the two annular galleries are linked by a conduit 357. Conduit 356 receives hydraulic fluid from a source H which may also be common to at least one other tube pressure filter, shown as TPF in the FIGURE.

As noted above, the construction of the remainder of tube pressure filter and the operation thereof is essentially the same as that of the tube pressure filters described in my said U.S. application Ser. No. 134,507.

Thus, the outer tubular body comprises a central, cylindrical steel section 301, upper and lower flange portions 314 and 315, an upper steel annular member 302, and a lower steel annular member 303. The outer tubular body also supports a framework 304. Between the upper flange portion 314 and upper steel annular member 302 there is formed a recess 308 in which there can be secured an end 332 of a rubber sleeve 330. In a similar manner, the other end 334 of the rubber sleeve 330 is secured in a recess 309 formed between lower flange portion 315 and the lower steel annular member 303.

The inner tubular body comprises a central, cylindrical steel section 320, an upper cap 322, an inner lower cap 319, an outer lower cap 323, an annular fairing 327 secured to the upper cap 322, and an annular fairing 328 secured to the lower outer cap 323. The central steel section 320 is provided with a number of apertures 370, through which filtrate can pass, and supports a filter element 368 on which the solid material is retained.

A conduit 360 extends into the inner tubular body and communicates with a chamber 362 formed between the inner and outer lower caps 319 and 323. Ducts 363 connect chamber 362 with an annular channel 364 which extends annularly around the base of the annular fairing 328. A hydraulic jack 372 is connected to the inner tubular body and enables the latter to be displaced relative to the outer tubular body. A conduit 374 enables air to be introduced into the inner tubular body and a further conduit, in the form of a syphon tube (not shown), enables filtrate to be removed from the inner tubular body.

In operation, a wet, particulate solid material to be treated is fed to the inner compartment via the conduit 360, chamber 362 ducts 363 and channel 364. A hydraulic fluid is fed to the outer compartment through the annular inlet slots 311A and 311B. Any air trapped in the outer compartment, i.e., that formed between the inner wall of the outer tubular body and the impermeable rubber sleeve 330, can be vented through the upper inlet slot 311A.

The pressure exerted by the hydraulic fluid is then increased to the desired value and filtrate is expressed through the filter element and the holes 370 in the inner tubular body. At the end of the pressure filtering operation, the hydraulic fluid is removed from the outer compartment by vacuum, filtrate is removed from the inner tubular body by the siphon tube, and the inner tubular body is lowered, relative to the outer tubular body, by the jack 372. Thereafter a number of air blasts are directed into the inner tubular body and, through the holes 370, act upon the filter element 368 to dislodge the cake of solid particulate material formed thereon. After the filter cake has been discharged, the jack 372 withdraws the inner tubular body into the outer tubular body and the cycle is repeated.

I claim:

1. A tube pressure filter which essentially comprises: (a) a pair of generally coaxial tubular bodies arranged one within the other, and adapted to be supported in a generally upright position, (b) an impermeable elastic sleeve disposed within and secured to the outer tubular body, (c) a filter element disposed around and supported by the inner tubular body, and (d) means for displacing the tubular bodies axially relative to one another between first and second positions, wherein the arrangement is such that in the first position of said tubular bodies they cooperate with each other to define a closed annular chamber which is divided into generally coaxial and non-intercommunicating inner and outer compartments by said impermeable elastic sleeve, and in the second position of said tubular bodies said annular chamber is open to enable particulate solid material to be discharged from the inner compartment, wherein the outer compartment has an inlet for a hydraulic fluid under pressure, wherein the inner compartment is provided with an inlet means for receiving a wet, particulate solid material, said inlet means being disposed at the lower end of the inner compartment and constructed such that, when the tubular bodies are supported in a generally upright position and in their first position, a wet particulate solid material to be pressure filtered can be charged to the bottom of said inner compartment through said inlet means, wherein the tube pressure filter includes means for distributing and directing the wet particulate solid material, substantially uniformly around the lower end of the inner compartment to enable scouring of at least the lower portion of the filter element, and wherein said outer compartment inlet for hydraulic fluid is in the form of a continuous substantially annular slot extending around the periphery of the outer tubular body at the bottom of said outer compartment.

2. A tube pressure filter according to claim 1, said inlet for hydraulic pressure fluid including at least one additional annular slot, said additional annular slot being located at the upper end of said outer compartment.

3. A tube pressure filter according to claim 2, the two annular slots being in communication with each other outside of the outer compartment, between the said outer compartment and the source of hydraulic fluid.

4. A tube pressure filter as claimed in claim 1, wherein said continuous annular slot has a width not greater than 1/2 inch.

5. A tube pressure filter as claimed in claim 1, wherein said annular inlet is connected to a source of hydraulic fluid which is common to at least one other tube pressure filter.

* * * * *